United States Patent
Enomoto et al.

(10) Patent No.: US 6,172,819 B1
(45) Date of Patent: Jan. 9, 2001

(54) ZOOM LENS SYSTEM

(75) Inventors: Takashi Enomoto, Chiba; Takayuki Ito, Saitama, both of (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/173,714

(22) Filed: Oct. 16, 1998

(30) Foreign Application Priority Data

Oct. 21, 1997 (JP) .................................................. 9-288332

(51) Int. Cl.⁷ .................................................. G02B 15/14
(52) U.S. Cl. .................................................. 359/692
(58) Field of Search ................................ 359/692, 691

(56) References Cited

U.S. PATENT DOCUMENTS

| | | | |
|---|---|---|---|
| 4,720,179 | 1/1988 | Ito | 359/692 |
| 4,906,077 | 3/1990 | Ito | 359/692 |
| 5,257,135 | * 10/1993 | Kohno et al. | 359/689 |
| 5,278,699 | 1/1994 | Ito | 359/692 |
| 5,570,235 | 10/1996 | Yoneyama | 359/692 |
| 5,687,028 | 11/1997 | Ito | 359/692 |
| 5,751,498 | 5/1998 | Ito | 359/692 |
| 5,900,991 | * 5/1999 | Kang | 359/692 |

* cited by examiner

Primary Examiner—Georgia Epps
Assistant Examiner—Tim Thompson
(74) Attorney, Agent, or Firm—Greenblum & Bernstein P.L.C.

(57) ABSTRACT

A zoom lens system which includes a positive first lens group and a negative second lens group, in this order from the object side; wherein zooming is performed by moving the first lens group and the second lens group, and by varying the distance between the first lens group and the second lens group; wherein the zoom lens system satisfies the following condition:

$$-7.0 < f_T/f_{2G} < -5.1 \ldots \quad (1)$$

wherein:

$f_T$ designates the focal length of the entire lens system at the long focal-length extremity and $f_{2G}$ designates the focal length of the second lens group.

6 Claims, 7 Drawing Sheets

FNO=7.0
— SA
-- SC
-0.5  0.5
SPHERICAL
ABERRATION
THE SINE
CONDITION

FNO=7.0
—— d LINE
---- g LINE
---- c LINE
-0.5  0.5
SPHERICAL
ABERRATION
CHROMATIC
ABERRATION

W=18.9°
— S
-- M
-0.5  0.5
ASTIGMATISM

W=18.9°
-5.0 % 5.0
DISTORTION

FNO=10.5
— SA
-- SC
-0.5  0.5
SPHERICAL
ABERRATION
THE SINE
CONDITION

FNO=10.5
—— d LINE
---- g LINE
---- c LINE
-0.5  0.5
SPHERICAL
ABERRATION
CHROMATIC
ABERRATION

W=12.4°
— S
-- M
-0.5  0.5
ASTIGMATISM

W=12.4°
-5.0 % 5.0
DISTORTION

FNO=4.1

—— SA
-- SC

-0.5    0.5
SPHERICAL
ABERRATION

THE SINE
CONDITION

FNO=4.1

—— d LINE
···· g LINE
--- c LINE

-0.5    0.5
SPHERICAL
ABERRATION

CHROMATIC
ABERRATION

W=30.0°

—— S
-- M

-0.5    0.5
ASTIGMATISM

W=30.0°

-5.0 %  5.0
DISTORTION

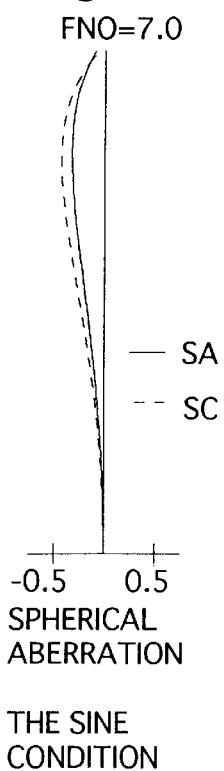
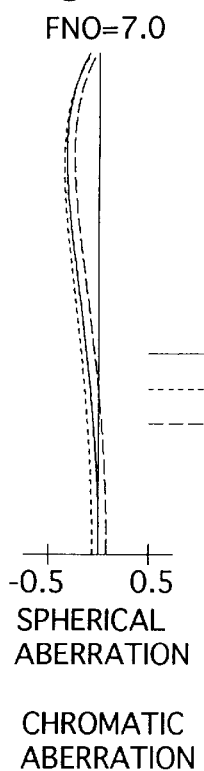
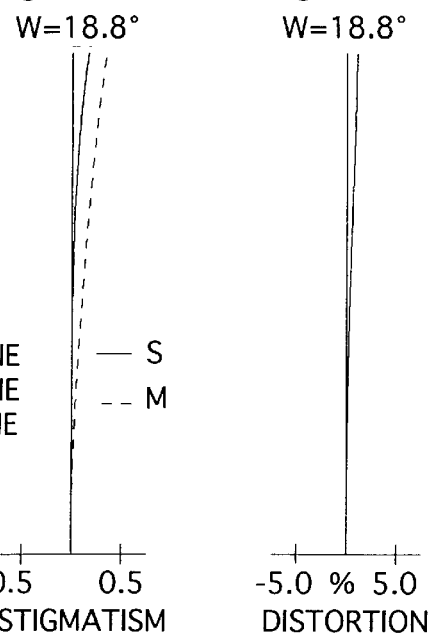
Fig. 7A FNO=7.0 SPHERICAL ABERRATION THE SINE CONDITION — SA, -- SC
Fig. 7B FNO=7.0 SPHERICAL ABERRATION CHROMATIC ABERRATION — d LINE, ---- g LINE, --- c LINE
Fig. 7C W=18.8° ASTIGMATISM — S, -- M
Fig. 7D W=18.8° DISTORTION
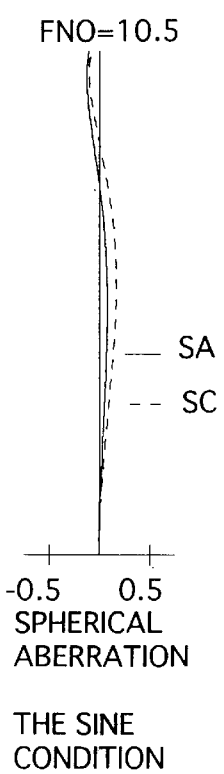
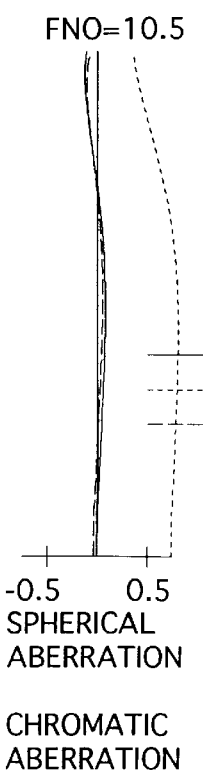
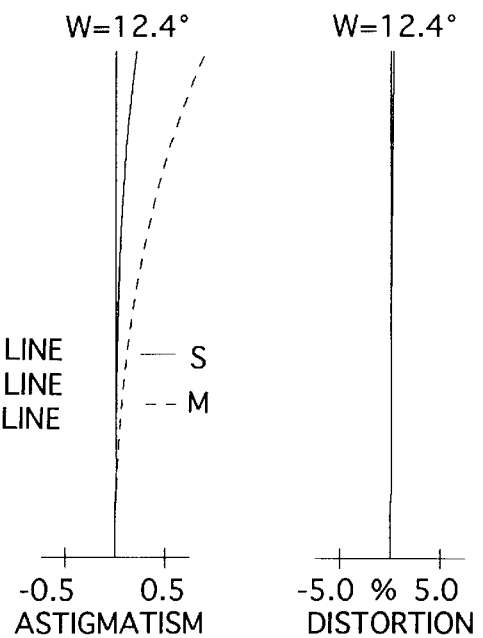
Fig. 8A FNO=10.5 SPHERICAL ABERRATION THE SINE CONDITION — SA, -- SC
Fig. 8B FNO=10.5 SPHERICAL ABERRATION CHROMATIC ABERRATION — d LINE, ---- g LINE, --- c LINE
Fig. 8C W=12.4° ASTIGMATISM — S, -- M
Fig. 8D W=12.4° DISTORTION

FNO=4.1

— SA
-- SC

-0.5  0.5
SPHERICAL
ABERRATION

THE SINE
CONDITION

FNO=4.1

—— d LINE
---- g LINE
—-— c LINE

-0.5  0.5
SPHERICAL
ABERRATION

CHROMATIC
ABERRATION

W=30.1°

— S
-- M

-0.5  0.5
ASTIGMATISM

W=30.1°

-5.0 % 5.0
DISTORTION

FNO=7.0

-0.5   0.5
SPHERICAL
ABERRATION

THE SINE
CONDITION

— SA
- - SC

FNO=7.0

-0.5   0.5
SPHERICAL
ABERRATION

CHROMATIC
ABERRATION

—— d LINE
------ g LINE
— — c LINE

W=18.9°

-0.5   0.5
ASTIGMATISM

— S
- - M

W=18.9°

-5.0 %  5.0
DISTORTION

FNO=10.5

-0.5   0.5
SPHERICAL
ABERRATION

THE SINE
CONDITION

— SA
- - SC

FNO=10.5

-0.5   0.5
SPHERICAL
ABERRATION

CHROMATIC
ABERRATION

—— d LINE
------ g LINE
— — c LINE

W=12.5°

-0.5   0.5
ASTIGMATISM

— S
- - M

W=12.5°

-5.0 %  5.0
DISTORTION

ZOOM LENS SYSTEM

BACKGROUND OF THE INVENTION

1. Field of the Invention

The present invention relates to a zoom lens system, having a short back focal length, of a compact camera; and in particular, a low cost zoom lens system having a zoom ratio ranging from about 2.5 to 3.

2. Description of the Related Art

A zoom lens system of a compact camera differs from that of a single-reflex camera in that the lens arrangement of a compact camera has more freedom of design due to fewer constraints on a back focal length (a short back focal length is acceptable). In a zoom lens system having a positive first lens group and a negative second lens group (two-lens-group type) in order from the object side, there are advantages, such as fewer lens elements, being small and compact, and the manufacture thereof being simple. For a zoom lens system, in the prior art, having a half-angle-of-view of about 30° at the short focal-length extremity (wide-angle extremity) and a zoom ratio ranging from about 2.5 to 3, a three-lens-group type has usually been employed in order to improve the optical performance thereof. In the three-lens-group type zoom lens system, the traveling distance of the third lens group can be reduced, so that the F-number at the long focal-length extremity (telephoto extremity) can be made smaller (brighter), and the fluctuations of aberrations upon zooming between the wide extremity and the telephoto extremity can be reduced. However, when comparing the three-lens-group type with the two-lens-group type, the former is larger in size and more complicated in the lens arrangement than the latter, which means that the number of lens elements has to be increased, and the size of the front most lens group (the first lens group) is increased. All of these factors have resulted in an increase of the overall manufacturing costs.

SUMMARY OF THE INVENTION

The object of the present invention is to provide a low cost two-lens-group type zoom lens system having a reduced traveling distances of the lens groups and reduced overall length of the lens system, and attaining a half-angle-of-view of about 30° and a zoom ratio in the range from about 2.5 to 3 while attaining satisfactory optical performance.

In order to achieve the above-mentioned object, there is provided a zoom lens system which includes a positive first lens group and a negative second lens group in this order from the object side; wherein zooming is performed by moving the first lens group and the second lens group, and by varying the distance between the first lens group and the second lens group; wherein the following condition is satisfied:

$$-7.0 < f_T/f_{2G} < -5.1 \ldots \quad (1)$$

wherein:

$f_T$ designates the focal length of the entire lens system at the long focal-length extremity and $f_{2G}$ designates the focal length of the second lens group.

The following condition is also preferably satisfied:

$$4.2 < f_T/f_{1G} < 6.0 \ldots \quad (2)$$

Wherein $f_{1G}$ designates the focal length of the first lens group.

At least one lens element in the negative second lens group preferably has an aspherical surface satisfying the following condition:

$$0 < \Delta I_{ASP} < 3 \ldots \quad (3)$$

Wherein $\Delta I_{ASP}$ designates the variation of the spherical aberration coefficients due to the aspherical surface when the focal length at the short focal-length extremity is assumed to be 1.0.

The present disclosure relates to subject matter contained in Japanese Patent Application No.09-288332 (filed on Oct. 21, 1997) which is expressly incorporated herein by reference in its entirety.

BRIEF DESCRIPTION OF THE DRAWINGS

The invention will be discussed below in detail with reference to the accompanying drawings, in which:

FIGS. 7A, 7B, 7C and 7D are aberration diagrams of the zoom lens system in FIG. 5 at a medium focal-length;

FIGS. 8A, 8B, 8C and 8D are aberration diagrams of the zoom lens system in FIG. 5 at the long focal-length extremity;

DESCRIPTION OF THE PREFERRED EMBODIMENT

Figure 13:
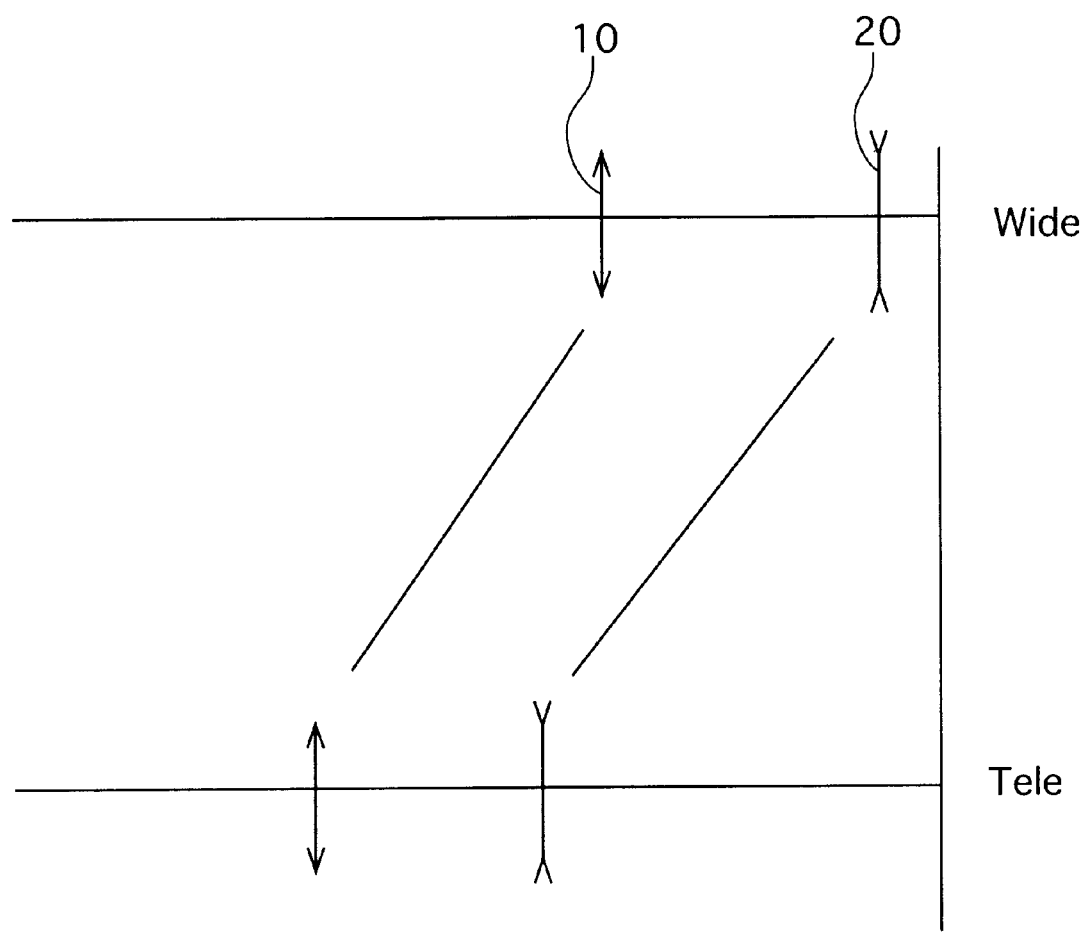
FIG. 13 shows the zooming paths of the zoom lens system of the present invention between the long focal-length extremity to the short focal-length extremity.

The zoom lens system of the present invention is a two-lens-group arrangement which includes a positive lens group and a negative lens group in this order from the object side. As can be seen in FIG. 13, when zooming is performed from the wide angle extremity to the telephoto extremity, the positive first lens group 10 and the negative second lens group 20 are moved together towards the object side whilst reducing the distance therebetween. Generally, in a two-lens-group zoom lens system, when a zoom ratio is increased, it becomes difficult to reduce the traveling distance of the rearmost lens group (the second lens group). Furthermore, along with the increased traveling distance, it has been thought that the entire length of the lens system increases, the F-number at the telephoto extremity increases (darker), and the fluctuations of aberrations upon zooming increase. Mainly due to these reasons, a two-lens-group type zoom lens system having a zoom ratio in the range from about 2.5 to 3 has not been put to practical use.

The inventors of the present invention eliminated the shortcomings, which have been experienced in a two-lens-group type zoom lens system, by appropriately setting the power of the rearmost lens group (the second lens group).

Condition (1) determines the ratio of the power of the second lens group and the power of the entire lens system at the long focal-length extremity. If condition (1) is satisfied, the traveling distances of the lens groups in the zoom lens system can be reduced, so that the entire length of the zoom lens system can be made shorter. Furthermore, if condition (1) is satisfied, the F-number at the telephoto extremity can be made smaller, and the fluctuations of aberrations that occur during zooming can be reduced. If the power of the second lens group is decreased (the focal length becomes longer) to the extent that $f_T/f_{2G}$ is higher than the upper limit, the traveling distances of the lens groups upon zooming becomes too long, which prevents possible shortening of the entire lens system and possible miniaturization thereof. Conversely, if the power of the second lens group is increased (the focal length becomes shorter) to the extent that $f_T/f_{2G}$ is lower than the lower limit, aberrations in the second lens group become excessive, and it becomes impossible to correct the fluctuations of aberrations that occur during zooming.

Condition (2) determines the ratio of the power of the first lens group and the power of the entire lens system at the long focal-length extremity. If condition (2) is satisfied, the length of the entire lens system can be reduced, and the diameter of the first lens group can also be reduced. If the power of the first lens group is increased (the focal-length becomes shorter) to the extent that $f_T/f_{1G}$ is higher than the upper limit, various aberrations that occur in the first lens group increase, and it becomes impossible to correct the fluctuations of aberrations that occur during zooming. Conversely, if the power of the first lens group is decreased (the focal-length becomes longer) to the extent that $f_T/f_{1G}$ is lower than the lower limit, the traveling distances of the lens groups during zooming are increased, which prevents possible miniaturization.

Condition (3) determines an aspherical surface formed on at least one surface of a lens element in the second lens group. Spherical aberration can be reduced by providing an aspherical surface that satisfies condition (3) in the second lens group. If $\Delta I_{ASP}$ is higher than the upper limit, the amount of asphericity becomes too large, which makes the manufacture of the aspherical surface difficult. Conversely, if $\Delta I_{ASP}$ is lower than the lower limit, the effects of the correcting of spherical aberration through the aspherical surface is reduced, so that sufficient correction of spherical aberration is prevented.

The relation between the aspherical surface coefficients and aberration coefficients will be described.

The aspherical surface is generally defined as follows:

$$x=cy^2/\{1+[1-(1+K)c^2y^2]^{1/2}\}+A4y^4+A6y^6+A8y^8+A10y^{10}+\ldots$$

wherein,
y designates a distance from the optical axis;
x designates a distance from a tangent plane of an aspherical vertex;
c designates a curvature of the aspherical vertex (1/r);
K designates a conic constant;
A4 designates a fourth-order aspherical coefficient;
A6 designates a sixth-order aspherical coefficient;
A8 designates a eighth-order aspherical coefficient; and
A10 designates a tenth-order aspherical coefficient;

In this equation, to obtain the aberration coefficient, the following substitution is done to replace K with "0" (Bi=Ai when K=0).

$$B4=A4+Kc^3/8$$

$$B6=A6+(K^2+2K)c^5/16$$

$$B8=A8+5(K^3+3K^2+3K)c^7/128$$

$$B10=A10+7(K^4+4k^3+6K^2+4K)c^9/256$$

Then, the following equation is obtained.

$$x=cy^2/\{1+[1-(1-c^2y^2)^{1/2}\}+B4y^4+B6y^6+B8y^8+B10y^{10+\ldots}$$

When the focal length f is normalized to be 1.0, the resultant value is transformed as follows. Namely, substitute the following equations into the above equation:

$$X=x/f,\ Y=y/f,\ C=fc$$

$$\alpha 4=f^3B4,\ \alpha 6=f^5B6,\ \alpha 8=f^7B8,\ \alpha 10=f^9B10$$

In this way, the following equation is obtained.

$$X=CY^2/\{1+[1-C^2Y^2]^{1/2}\}+\alpha 4Y^4+\alpha 6Y^6+\alpha 8Y^8+\alpha 10Y^{10+\ldots}$$

The second and subsequent terms define the amount of asphericity of the aspherical surface.

Then, the third order aberration contributions due to the fourth order aspherical coefficient a 4 are obtained as follows:

$$\Delta I=h^4\Phi$$

$$\Delta II=h^3k\Phi$$

$$\Delta III=h^2k^2\Phi$$

$$\Delta IV=h^2k^2\Phi$$

$$\Delta V=hk^3\Phi$$

Wherein,
I designates the spherical aberration coefficient,
II designates the coma coefficient,
III designates the astigmatism coefficient,
IV designates the sagittal field of curvature coefficient,
V designates the distortion coefficient,
h designates the height at which a paraxial axial on-axis ray is made incident on the aspherical surface; and
k designates the height at which a paraxial off-axis ray (from the off axis object point) through the center of the entrance pupil is made incident on the aspherical surface; and $$\Phi=8(N'-N)\alpha 4$$

wherein N designates the refractive index of a substance on the object side of the aspherical surface, and N' designates the refractive index of a substance on the image side of the aspherical surface.

Specific numerical data of the embodiments will be described below through the tables and diagrams; wherein $F_{NO}$ designates the F-number, f designates the focal-length, W designates the half-angle-of-view, $f_B$ designates the back focal length, R designates the radius of curvature of each lens surface, D designates the lens thickness or distance, $N_d$ designates refractive index of the d-line, and υ represents the Abbe number of the d-line. Furthermore, in the aberration diagrams, SA designates spherical aberration, SC designates the sine condition; the d, g and c lines designate the chromatic aberration represented by spherical aberration at the respective wave length; S designates the sagittal image surface, and M designates the meridional image surface.

[Embodiment 1]

Figure 1:
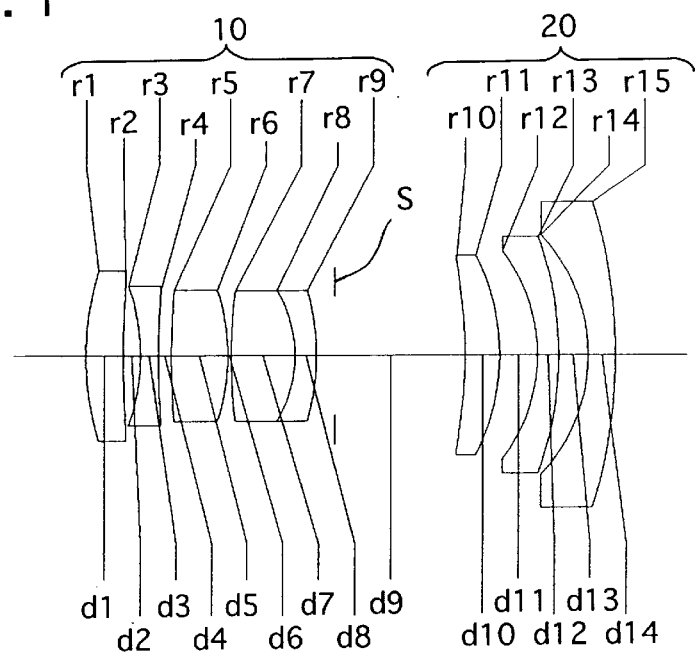
FIG. 1 is a lens arrangement of the first embodiment of the zoom lens system at the long focal-length extremity according to the present invention.
Figure 2A:
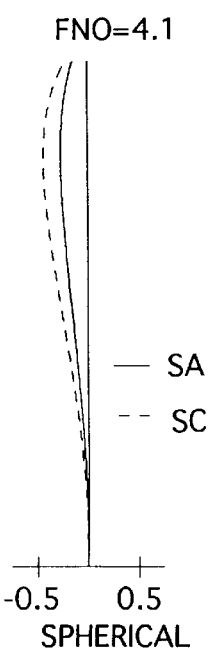
FIGS. 2A, 2B, 2C and 2D are aberration diagrams of the zoom lens system in FIG. 1 at the short focal-length extremity.
Figure 2B:
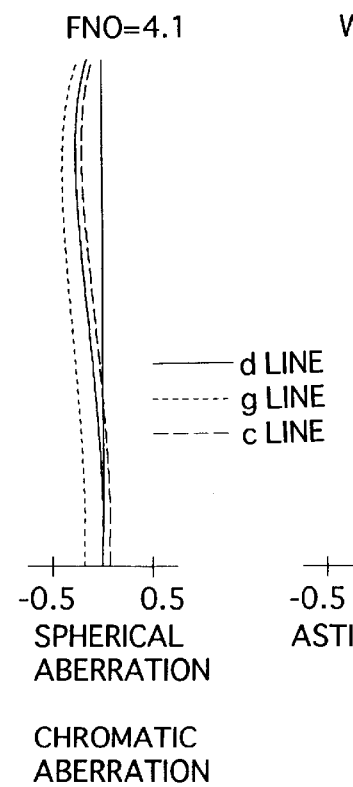
Figure 2C:
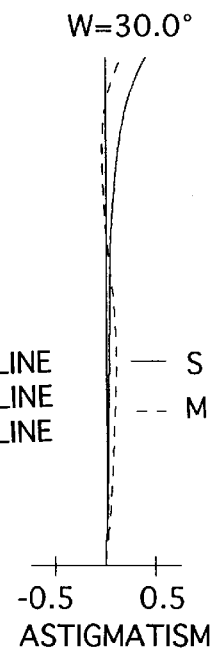
Figure 2D:
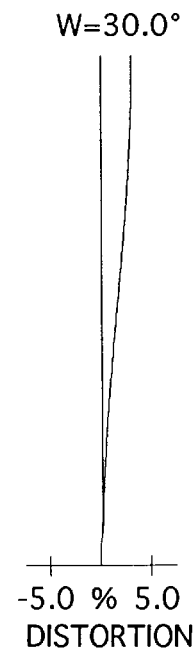
Figure 3A:
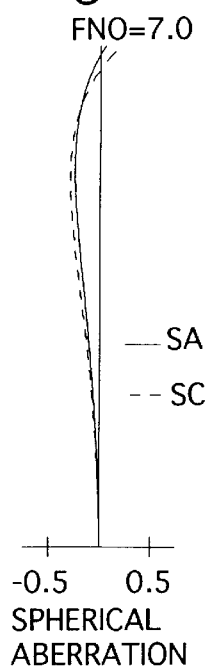
FIGS. 3A, 3B, 3C and 3D are aberration diagrams of the zoom lens system in FIG. 1 at a medium focal-length.
Figure 3B:
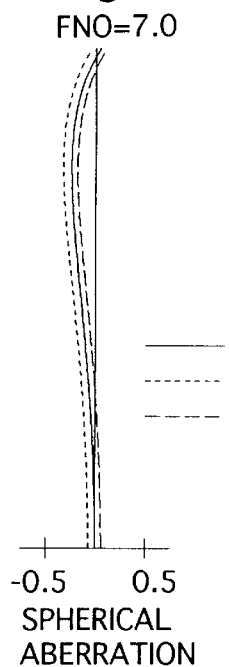
Figure 3C:
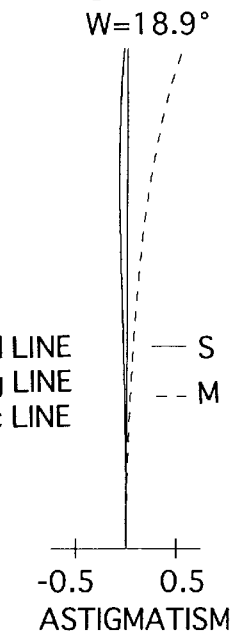
Figure 3D:
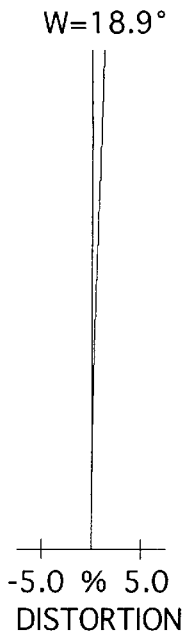
Figure 4A:
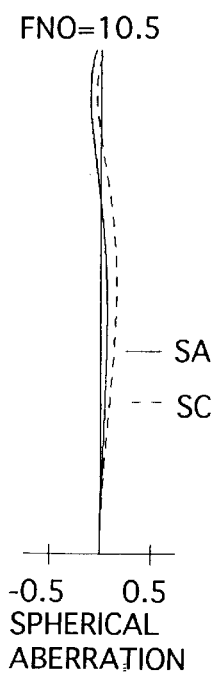
FIGS. 4A, 4B, 4C and 4D are aberration diagrams of the zoom lens system in FIG. 1 at the long focal-length extremity.
Figure 4B:
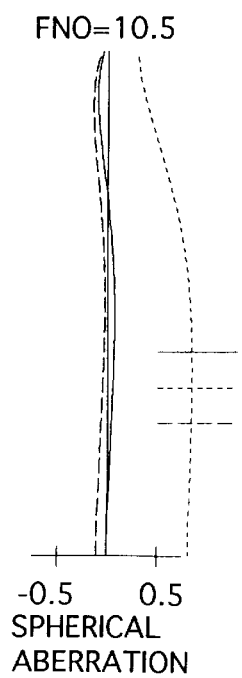
Figure 4C:
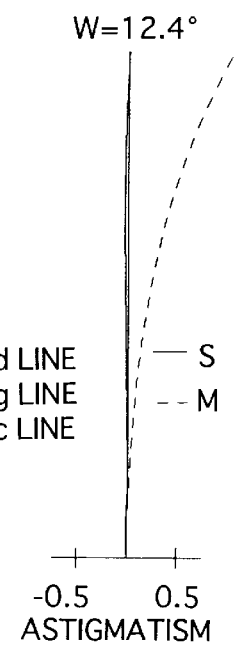
Figure 4D:
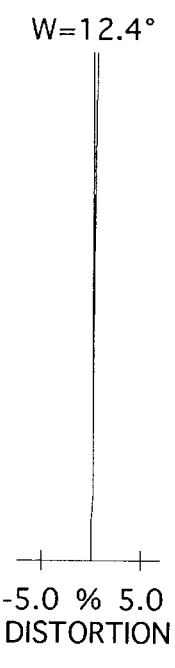

FIGS. 1 through 4 show the first embodiment of the zoom lens system according to the present invention. FIG. 1 is a lens arrangement of the zoom lens system including, in order from the object side, a positive first lens group 10 composed of five lens elements divided into four sub-lens groups, a diaphragm S, and a negative second lens group 20 composed of three lens elements divided into three sub-lens groups. FIGS. 2, 3 and 4 show aberration diagrams for the short focal-length extremity, a medium focal-length, and the long focal-length extremity of the zoom lens system, respectively. Table 1 shows the numerical data thereof.

TABLE 1

$F_{NO}$ = 1:4.1–7.0–10.5
f = 29.00–50.00–78.00 (zoom ratio = 2.69)
W = 30.0°–18.9°–12.4°
$f_B$ = 6.96–23.30–45.09

| Surface No. | R | D | $N_d$ | $v_d$ |
|---|---|---|---|---|
| 1 | 16.042 | 2.08 | 1.58267 | 46.6 |
| 2 | 61.070 | 0.95 | — | — |
| 3 | −11.891 | 1.00 | 1.83400 | 37.2 |
| 4 | 46.580 | 0.72 | — | — |
| 5 | 43.300 | 3.18 | 1.51633 | 64.1 |
| 6 | −11.525 | 0.20 | — | — |
| 7 | 31.747 | 3.58 | 1.58267 | 46.4 |
| 8 | −7.056 | 1.20 | 1.83400 | 37.2 |
| 9 | −12.690 | 1.00 | — | — |
| Diaphragm | ∞ | 7.30–3.73–1.96 | | |
| 10* | −23.588 | 1.92 | 1.58547 | 29.9 |
| 11 | −12.107 | 2.09 | — | — |
| 12 | −9.471 | 1.20 | 1.80400 | 46.6 |
| 13 | −19.023 | 1.65 | — | — |
| 14 | −9.680 | 1.50 | 1.83481 | 42.7 |
| 15 | −28.800 | — | — | — |

*designates the aspherical surface which is symmetrical with respect to the optical axis.

Aspherical data (the aspherical coefficient is zero when not indicated):

No.10: K=0.00, A4=0.74870×10$^{-4}$, A6=0.26770×10$^{-5}$, A8=−0.22100×10$^{-7}$

[Embodiment 2]

Figure 5:
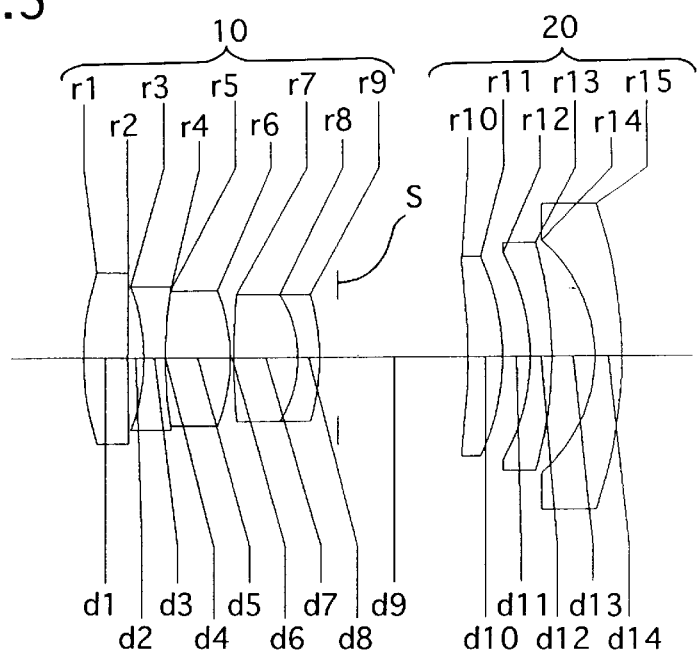
FIG. 5 is a lens arrangement of the second embodiment of the zoom lens system at the long focal-length extremity according to the present invention.
Figure 6A:
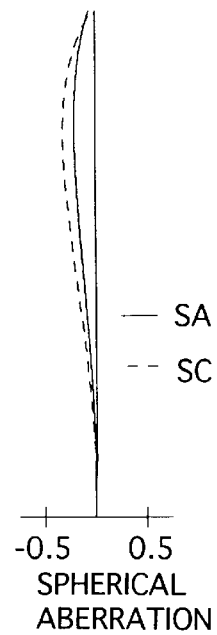
FIGS. 6A, 6B, 6C and 6D are aberration diagrams of the zoom lens system in FIG. 5 at the short focal-length extremity.
Figure 6B:
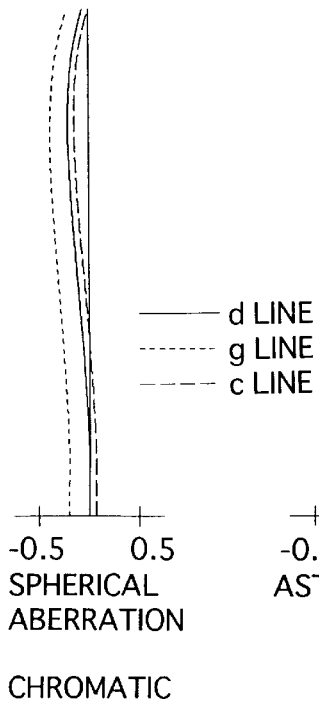
Figure 6C:
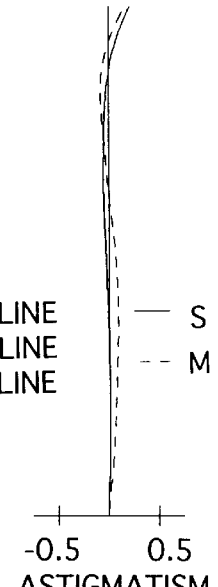
Figure 6D:
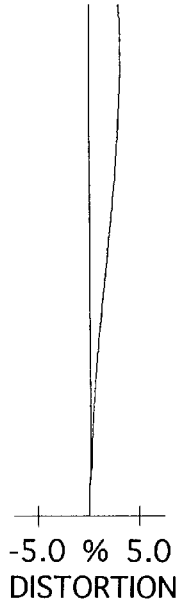

FIGS. 5 through 8 show the second embodiment of the zoom lens system according to the present invention. FIG. 5 is a lens arrangement of the zoom lens system; FIGS. 6, 7 and 8 show aberration diagrams for the short focal-length extremity, a medium focal-length, and the long focal-length extremity of the zoom lens system, respectively; Table 2 shows the numerical data thereof. The basic lens arrangement is the same as the first embodiment.

TABLE 2

$F_{NO}$ = 1:4.1–7.0–10.5
f = 29.00–50.00–78.00 (zoom ratio = 2.69)
W = 30.0°–18.8°–12.4°
$f_B$ = 6.83–23.05–44.68

| Surface No. | R | D | $N_d$ | $v_d$ |
|---|---|---|---|---|
| 1 | 15.423 | 2.46 | 1.53172 | 48.9 |
| 2 | 144.000 | 0.90 | — | — |
| 3 | −11.652 | 1.20 | 1.83400 | 37.2 |

TABLE 2-continued

| | | | | |
|---|---|---|---|---|
| 4 | 25.647 | 0.00 | — | — |
| 5 | 25.647 | 3.60 | 1.48749 | 70.2 |
| 6 | −10.788 | 0.20 | — | — |
| 7 | 38.823 | 3.60 | 1.63930 | 44.9 |
| 8 | −6.818 | 1.20 | 1.83481 | 42.7 |
| 9 | −12.734 | 1.00 | — | — |
| Diaphragm | ∞ | 7.26–3.64–1.84 | | |
| 10* | −29.730 | 1.92 | 1.58547 | 29.9 |
| 11 | −13.423 | 1.54 | — | — |
| 12 | −11.785 | 1.20 | 1.83481 | 42.7 |
| 13 | −22.643 | 2.40 | — | — |
| 14 | −8.580 | 1.50 | 1.83481 | 42.7 |
| 15 | −26.041 | — | — | — |

*designates the aspherical surface which is symmetrical with respect to the optical axis.

Aspherical data (the aspherical coefficient is zero when not indicated):

No.10: K=0.00, A4=0.91200×10$^{-4}$, A6=0.30750×10$^{-5}$, A8=−0.23900×10$^{-7}$

[Embodiment 3]

Figures 9, 10A, 10B, 10C, 10D:
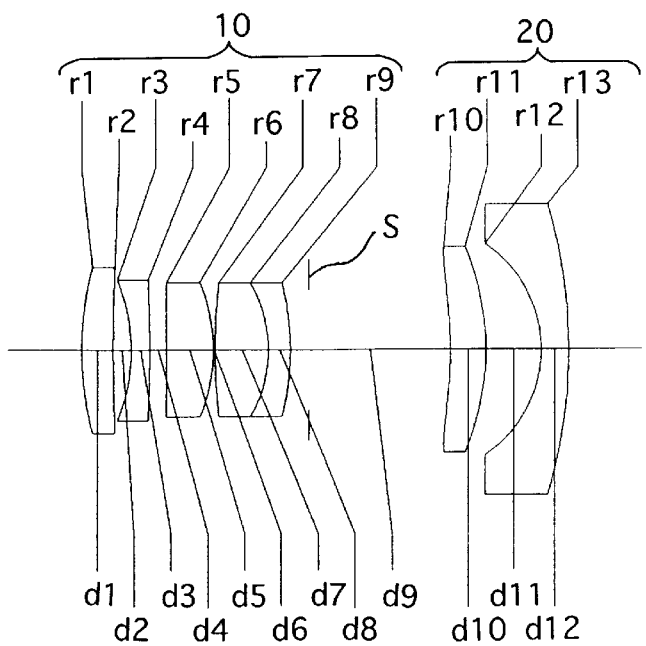
FIG. 9 is a lens arrangement of the third embodiment of the zoom lens system at the long focal-length extremity according to the present invention.
FIGS. 10A, 10B, 10C and 10D are aberration diagrams of the zoom lens system in FIG. 9 at the short focal-length extremity.
Figure 11A:
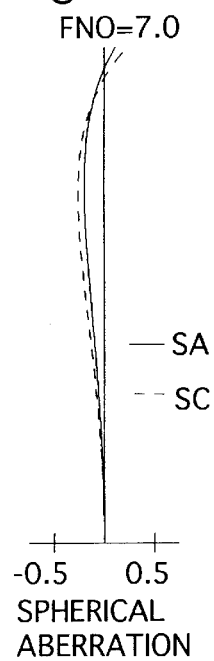
FIGS. 11A, 11B, 11C and 11D are aberration diagrams of the zoom lens system in FIG. 9 at a medium focal-length.
Figure 11B:
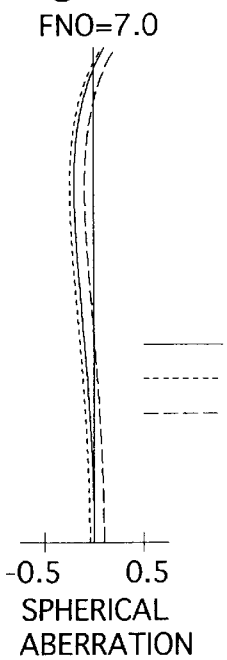
Figure 11C:
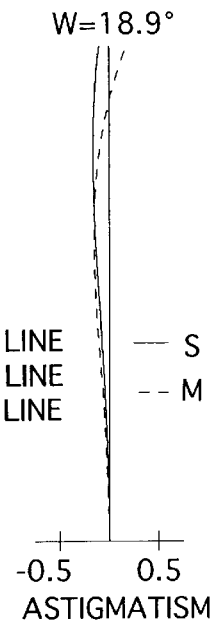
Figure 11D:
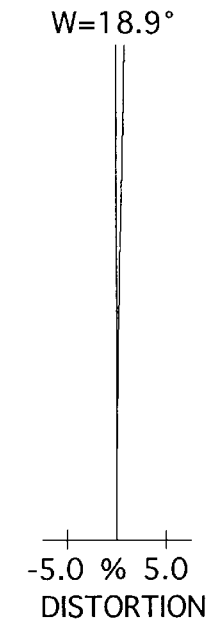
Figure 12A:
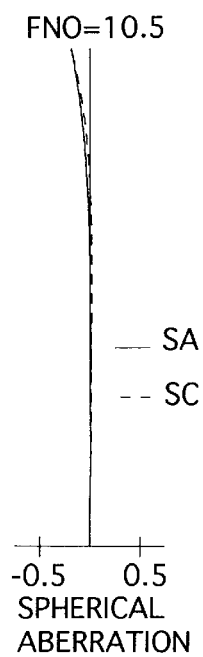
FIGS. 12A, 12B, 12C and 12D are aberration diagrams of the zoom lens system in FIG. 9 at the long focal-length extremity.
Figure 12B:
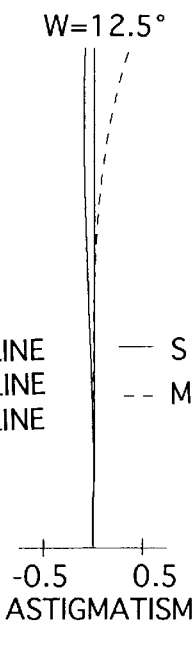
Figure 12C:
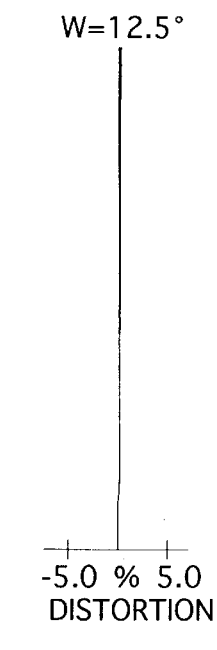
Figure 12D:
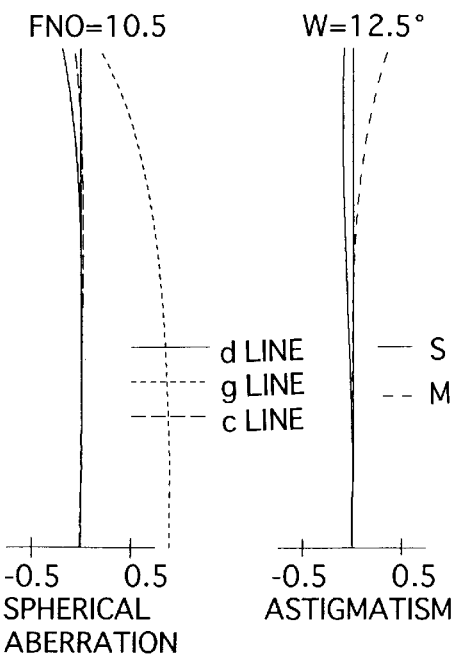

FIGS. 9 through 12 show the third embodiment of the zoom lens system according to the present invention. FIG. 9 is a lens arrangement of the zoom lens system; FIGS. 10, 11 and 12 show aberration diagrams for the short focal-length extremity, a medium focal-length, and the long focal-length extremity of the zoom lens system, respectively; Table 3 shows the numerical data thereof. The first lens group 10 is composed of five lens elements divided into four groups, and the second lens group 20 is composed of elements divided into two sub-lens groups.

TABLE 3

$F_{NO}$ = 1:4.1–7.0–10.5
f = 29.00–50.00–78.00 (zoom ratio = 2.69)
W = 30.1°–18.9°–12.5°
$f_B$ = 8.20–25.53–48.63

| Surface No. | R | D | $N_d$ | $v_d$ |
|---|---|---|---|---|
| 1 | 17.733 | 1.70 | 1.54475 | 46.1 |
| 2 | 93.173 | 0.99 | — | — |
| 3 | −10.251 | 1.00 | 1.84999 | 36.0 |
| 4 | −87.853 | 0.90 | — | — |
| 5 | 2055.322 | 2.53 | 1.50000 | 63.7 |
| 6 | −9.755 | 0.10 | — | — |
| 7 | 35.305 | 2.91 | 1.59773 | 48.9 |
| 8 | −7.262 | 1.20 | 1.83999 | 42.4 |
| 9 | −14.482 | 1.00 | — | — |
| Diaphragm | ∞ | 7.68–3.85–1.96 | | |
| 10* | −22.608 | 1.92 | 1.58547 | 29.9 |
| 11 | −14.399 | 3.04 | — | — |
| 12 | −6.900 | 1.50 | 1.80400 | 46.6 |
| 13 | −27.829 | — | — | — |

*designates the aspherical surface which is symmetrical with respect to the optical axis.

Aspherical data (the aspherical coefficient is zero when not indicated):

No.10: K=0.00, A4=0.21331×10$^{-3}$, A6=0.16587×10$^{-5}$, A8=0.66966×10$^{-7}$

Table 4 shows the numerical data for each condition for embodiments 1 through 3.

TABLE 4

|  | Embodiment 1 | Embodiment 2 | Embodiment 3 |
|---|---|---|---|
| Condition (1) | −5.63 | −5.61 | −5.28 |
| Condition (2) | 4.38 | 4.34 | 4.36 |
| Condition (3) | 0.84 | 1.05 | 2.12 |

As can be clearly seen from Table 4, embodiments 1 through 3 satisfy conditions (1) through (3).

According to the present invention, a low cost two-lens-group type zoom lens system is attained wherein the traveling distances of the lens groups and overall length the lens system are reduced, and furthermore a half-angle-of-view is about 30°, a zoom ratio is in the range of about 2.5 to 3, and satisfactory optical performance is obtained.

What is claimed is:

1. A zoom lens system consisting of a positive first lens group and a negative second lens group, in this order from the object side, wherein zooming is performed by moving said first lens group and said second lens group, and by varying the distance between said first lens group and said second lens group;

wherein said zoom lens system satisfies the following condition:

$-7.0 < f_T/f_{2G} \leq -5.28$ wherein:

$f_T$ designates the focal length of the entire lens system at the long focal-length extremity; and $f_{2G}$ designates the focal length of said second lens group.

2. The zoom lens system according to claim 1, wherein said zoom lens system further satisfies the following condition:

$4.2 < f_T/f_{1G} < 6.0$ wherein $f_{1G}$ designates the focal length of said first lens group.

3. The zoom lens system according to claim 1, wherein at least one lens element in said negative second lens group has an aspherical surface that satisfies the following condition:

$0 < \Delta I_{ASP} < 3$ wherein:

$\Delta I_{ASP}$ designates the variation of the spherical aberration coefficients of said aspherical surface when the focal length at the short focal-length extremity is assumed to be 1.0.

4. The zoom lens system according to claim 2, wherein at least one lens element in said negative second lens group has an aspherical surface that satisfies the following condition:

$0 < \Delta I_{ASP} < 3$ wherein:

$\Delta I_{ASP}$ designates the variation of the spherical aberration coefficients of said aspherical surface when the focal length at the short focal-length extremity is assumed to be 1.0.

5. A zoom lens system comprising a positive first lens group and a negative second lens group, in this order from the object side, wherein zooming is performed by moving said first lens group and said second lens group, and by varying a distance between said first lens group and said second lens group;

wherein said zoom lens system satisfies the following relationships:

$-7.0 < f_T/f_{2G} < 5.1$ $4.2 < f_T/f_{1G} < 6.0$ wherein:

$f_T$ designates a focal length of the entire zoom lens system at a long focal-length extremity;

$f_{2G}$ designates the focal length of said second lens group; and $f_{1G}$ designates the focal length of said first lens group.

6. The zoom lens system according to claim 5, wherein at least one lens element in said negative second lens group has an aspherical surface that satisfies the following relationship:

$0 < \Delta I_{ASP} < 3$ wherein:

$\Delta I_{ASP}$ designates the variation of the spherical aberration coefficients of said spherical surface when the focal length at the short focal-length extremity is assumed to be 1.0.

* * * * *